United States Patent [19]

Schulz et al.

[11] Patent Number: 4,792,593
[45] Date of Patent: Dec. 20, 1988

[54] NOVEL ACRYLAMIDE ACRYLATE COPOLYMERS

[75] Inventors: Donald N. Schulz, Annandale; Enock Berluche, Phillipsburg; John J. Maurer, New Providence; Jan Bock, Bridgewater, all of N.J.

[73] Assignee: Exxon Research and Engineering Company, Florham Park, N.J.

[21] Appl. No.: 116,893

[22] Filed: Nov. 5, 1987

[51] Int. Cl.[4] ............................................. C08F 30/04
[52] U.S. Cl. ................................................ 526/240
[58] Field of Search ...................................... 526/240

[56] References Cited

U.S. PATENT DOCUMENTS

| | | | |
|---|---|---|---|
| 3,896,161 | 7/1975 | Borden et al. | 526/304 |
| 4,075,411 | 2/1978 | Dickstein | 524/43 |
| 4,268,400 | 5/1981 | Lucas et al. | 526/240 |
| 4,268,641 | 5/1981 | Koenig et al. | 525/367 |
| 4,463,152 | 7/1984 | Schulz et al. | 526/307.5 |

FOREIGN PATENT DOCUMENTS

| | | | |
|---|---|---|---|
| 60-28597 | 2/1985 | Japan | 526/240 |
| 828496 | 2/1960 | United Kingdom . | |
| 1054028 | 1/1967 | United Kingdom | 526/240 |

*Primary Examiner*—Joseph L. Schofer
*Assistant Examiner*—N. Sarofim

*Attorney, Agent, or Firm*—Richard E. Nanfeldt

[57] ABSTRACT

A terpolymer having the formula:

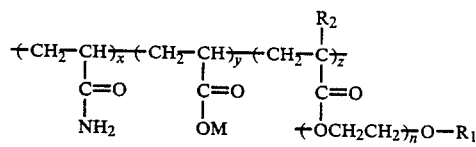

wherein $R_1$ is selected from the group consisting of $C_1$ to $C_{20}$ alkyl groups, $C_6$ to $C_{20}$ aryl groups and $C_6$ to $C_{30}$ alkylaryl groups; $R_2$ is hydrogen or methyl group, n is about 1 to 60; y is about 2.0 to about 35.0 mole %, and x is about 65.00 to about 98.00 mole %, z is about 0.1 to about 3.0 mole % and n is about 1 to about 60 and M is a metal cation selected from the group consisting of Groups IA, IIA, IB and IIB of the Periodic Table of Elements, wherein said terpolymer has an intrilsic viscosity of about 1 top about 25, wherein said terpolymer is formed by a free radical solution polymerization in the absence of a surfactant or emulsifier and comprises the polymerization of an acrylamide monomer, a metal acrylate monomer and an alkyl poly(etheroxy) acrylate monomer in the presence of a free radical initiation at a temperature of at least 5° C. for at least 0.5 hours.

10 Claims, No Drawings

NOVEL ACRYLAMIDE ACRYLATE COPOLYMERS

BACKGROUND OF THE INVENTION

Polyacrylamide (PAM) and hydrolyzed polyacrylamide (HPAM) are common water soluble polymers that have found application in oil field chemicals, paints, paper making, cosmetics, etc. The solution rheology of these materials define their use in these applications. With these polymers, aqueous viscosification or thickening is achieved through a combination of high molecular weight and chain expansion due to repulsion of pendent ionic groups along the polymer chain. High molecular weight polymers are difficult to prepare and dissolve and are also sensitive to shear. Viscosification due to charge repulsion is salt sensitive and thus, finds limited utility in highly saline systems.

Polymerizable esters of acrylic acid or methacrylic acid with alkyl or alkylaryl poly(ethyleneoxy)ethyl alcohols are disclosed in Dickstein U.S. Pat. No. 4,075,411; Trecker, U.S. Pat. No. 3,896,161; and British Pat. No. 828,496. Such monomers have found use in the preparation of stable latexes and special textiles.

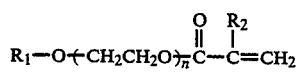

Copolymers of base-neutralized acrylic acid and nonionic surfactant acrylates have also found use as thickeners for both aqueous solutions and water/organic liquid emulsions (Koenig and Bryant, U.S. Pat. No. 4,268,641). Improved NaCl tolerance is also taught therein. A liquid composition useful as a thickening agent in polymer latexes, comprising a mixture of solvent and a terpolymer of acrylic acid, an ester of the formula of:

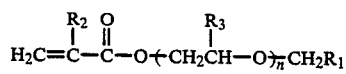

and an alkyl acrylate or methacrylate is claimed in U.S. Pat. No. 4,138,381.

In U.S. Ser. No. 454,286, now U.S. Pat. No. 4,463,152, Schulz, Maurer, and Bock (Exxon) disclosed copolymers having the formula which comprise:

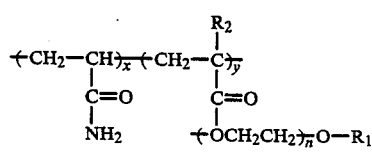

wherein $R_1$ is selected from the group consisting of $C_1$ to $C_{20}$ alkyl groups, $C_6$ to $C_{20}$ aryl groups and $C_6$ to $C_{30}$ alkylaryl groups; $R_2$ is hydrogen or a methyl group, n is about 1 to 60; y is about 0.010 to about 5.00 mole %, and x is about 95.00 to about 99.99 mole %.

U.S. Pat. No. 4,268,641 teaches base-neutralized copolymer having copolymerized therein about 90–99 mole percent of a carboxylic acid containing unsaturated hydrocarbon and about 1–10 mole percent of a nonionic surfactant acrylate having the formula:

wherein R is H or $CH_3$, $R^1$ is a hydrophobe selected from the group consisting of alkyl—O—, alkyl—CH—, and alkyl—CO—, where alkyl contains 4–30 carbon atoms, A is a divalent radical selected from the group consisting of oxyethylene or oxyalkylene units or mixed oxyalkylene units —$(OC_nH_{2n})_x$— where n is an integer from 2 to 4 and x is an integer of 5–40, said surfactant acrylate having an HLB (hydrophilic lipophilic balance) value of about 10–19. Improved NaCl tolerant thickening is also taught. However, the polymers displaying the optimum NaCl compatibility were those with very high acrylic acid contents (98–99 mole %). Moreover, the preferred method for preparing these copolymers is by heterogeneous precipitation polymerization from organic solvents (nonsolvents for the polymer) like benzene, toluene, xylene, tetralin, etc. Precipitation polymerizations often have non-uniform copolymer composition because the product tends to precipitate before reaching complete conversion or ultimate chain length.

U.S. Pat. No. 4,421,902 discloses copolymers which are derived from at least 10 wt.% of an unsaturated acid monomer, 0.5–25 wt.% of an alkyl polyoxyethylene poly-(carbonyloxyethylene) acrylate (I), 0–0.1 wt.% of a polyethylenically unsaturated monomer and optionally an unsaturated comonomer (II). The acid monomer is methacrylic, acrylic, itaconic, acryloxypropionic, maleic, fumaric, itaconic or crotonic acid. (I) has the formula $H_2C=CH-C(O)-O-(CH_2CH_2C(O)-O)x-(CH_2CH_2O)nR$, where R is 8–30C alkyl, alkyaryl or polycyclic alkyl, x=0.1–10 and n is at least two and is up to 60 on average. Up to 50% of the ($CH_2CH_2$) units can be substituted by 1,2-oxypropylene or oxybutylene units. (II) has the formula $CH_2=CYZ$ where Y is H with Z as COOR', $C_6H_4Z$, CN, Cl, $CONH_2$, OC(O)Z' or $CH=CH_2$; Y is 1–4C alkyl with Z as COOR', $C_6H_4Z$, CN, $CONH_2$ or $CH=CH_2$; R' is 1–8C alkyl or 2–8C hydroxyalkyl or alkoxy (2–8C alkyl); Z is H, Cl, Br or 1–4C alkyl; Z is 1–8C alkyl; or Y and Z can both be Cl. Good salt tolerance is also taught but not exemplified therein. Also, such polymers include

groups in the backbone which are known to be weak hydrolyzable links. In addition, products of this invention are aqueous dispersions of water-insoluble emulsion copolymers which require base neutralization for solubilization.

The present invention relates to terpolymers of acrylamide, acrylic acid (salt), and nonionic polyether surfactant acrylates of the formula

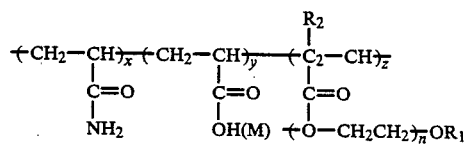

wherein $R_1$ is selected from a group consisting of $C_1$–$C_{20}$ alkyl groups, $C_6$ to $C_{20}$ aryl groups, or $C_6$ to $C_{30}$ alkylaryl groups; $R_2$ is hydrogen or a methyl group, n=1 to 60; x is 65–98 mole%; y is 2–35 mole%; z is 0.1 to 3.0 mole%.

PRESENT INVENTION

Unlike the prior art, the present invention discloses substantially terpolymers of acrylamide acrylic salt and nonionic surfactant monomers such as

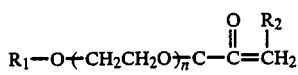

where $R_1$=alkyl, $C_1$-$C_{20}$; aryl, $C_6$-$C_{30}$; alkylaryl, $C_6$-30; and $R_2$=H or $CH_3$; n=1-60. These surfactant monomers can be referred to as alkyl poly(etheroxy)acrylates or R—PEO—AC.

The compositions of the instant invention are distinguished from nonionic polyacrylamide homopolymers by their higher solution rheological behavior, e.g., viscosification efficiencies. They are different from hydrolyzed polyacrylamide, a copolymer of acrylic acid salt and acrylamide, by virtue of their higher thickening ability and concentration dependence of viscosity in a brine environment and often higher retention of viscosity in the presence of inorganic electrolytes. Of course, viscosities of polymer solutions containing inorganic electrolytes are a function of such factors as polymer structure, molecular weight, concentration, amount of alkyl (etheroxy)acrylate, etc.

The present invention is distinct from the acrylic acid salt and nonionic surfactant acrylates of Koenig and Bryant because different comonomers (i.e., acrylamide vs. salts of acrylic acid) and aqueous, rather than hydrocarbon emulsion polymerization methods, are used. Moreover, the instant copolymers are prepared in a one-step process, i.e., neutralization is not required. Furthermore, acrylic acid-based polymers are to be avoided for oil field applications because of the known susceptibility of acrylic acid (and its salts) to precipitation by polyvalent cations (e.g., $Ca^{++}$); the latter species are often found in geological formations. (F. J. Glaris in "Water Soluble Resins 2nd Ed", R. L. Davidson and M. Sittig, Eds., Rheinhold, NY, p. 168).

The instant invention describes a novel class of acrylamide terpolymers containing alkyl poly(etheroxy) acrylate groups. These terpolymers are water soluble and many exhibit salt insensitive aqueous viscosification. The mechanism of solution viscosity enhancement is different from that found in the prior art systems based on polyacrylamide and hydrolyzed polyacrylamide. In the compositions of the present invention, the presence of a small amount of hydrophobic or water insoluble alkyl group on the surfactant comonomer is believed to result in intermolecular aggregation or interaction in solution. This aggregation results in enhanced viscosity relative to a noninteracting polymer such as polyacrylamide. Furthermore, the presence of ethylene oxide groups on the surfactant comonomer can be used to adjust polymer solubility and influence viscosity. The relative salt insensitivity of the solution viscosity of these novel copolymers distinguishes them from viscosifiers based on charge repulsion such as hydrolyzed polyacrylamide.

SUMMARY OF THE INVENTION

The present invention relates to unique and novel water soluble terpolymers of acrylamide, acrylic salt and alkyl poly(etheroxy)acrylate and a process for preparing these copolymers. These polymers are prepared by a free radical copolymerization process, wherein the acrylamide monomer, metal acrylate monomer, and alkyl poly(etheroxy)acrylate monomer are added to deoxygenated water under a nitrogen purge; the polymerization solution is heated to a temperature sufficient to activate the initiator; free radical initiator is added to the polymerization solution to initiate polymerization; polymerizing the acrylamide monomer, metal acrylate monomer, and alkyl poly(etheroxy)acrlyate monomer for a sufficient time and at a sufficient temperature to form the water soluble terpolymer of acrylamide, metal acrylate and alkyl poly(etheroxy) acrylate; and recovering the formed water soluble copolymer from the polymerization solution. Many of these water soluble copolymers of acrylamide and alkyl poly (etheroxy) acrylate are excellent viscosification agents in salt water.

GENERAL DESCRIPTION

The water soluble copolymers of acrylamide, metal acrylate and alkyl poly(etheroxy)acrylate of the present invention are formed by a free radical copolymerization process in an aqueous medium. These water soluble copolymers of acrylamide, metal acrylate and alkyl poly (etheroxy)acrylate are useful as viscosifiers in water and in aqueous solutions containing inorganic electrolytes.

The free radical copolymerization process used to form these water soluble copolymers of acrylamide, metal acrylate and alkyl poly(etheroxy)acrylate comprises adding acrylamide and metal acrylate monomer to deoxygenated water under a nitrogen atmosphere; adding alkyl poly(etheroxy)acrylate monomer to the solution of water and acrylamide monomer and metal acrylate monomer to form the polymerization solution; heating the polymerization solution to a sufficient temperature to activate the initiator; adding free radical initiator to the polymerization solution to cause initiation of the copolymerization of the acrylamide monomer, metal acrylate monomer and the alkyl poly(etheroxy)acrylate monomer; terpolymerizing the acrylamide monomer, metal acrylate monomer and alkyl poly(etheroxy)acrylate monomer at a temperature of at least 5° C. for at least 2 hours, more preferably at least 20° C., to form the water soluble terpolymer of acrylamide, metal acrylate and alkyl poly (etheroxy)acrylate; and recovering the precipitation or dialysis of the formed water soluble terpolymer of acrylamide, metal acrylate and alkyl poly(etheroxy)acrylate from the polymerization solution.

The water soluble terpolymers of acrylamide, metal acrylate and alkyl poly(etheroxy)acrylate can be substantially represented by the formula:

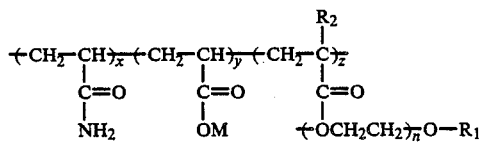

wherein $R_1$ is selected from the group consisting of $C_1$ to $C_{20}$ alkyl groups, $C_6$ to $C_{20}$ aryl groups and $C_6$ to $C_{30}$ alkylaryl groups; $R_2$ is hydrogen or a methyl group, n is about 1 to about 60, more preferably about 5 to about 50, and most preferably about 8 to about 45; y is about 2 to about 35 mol.%, more preferably about 5.0 to about 25., and most preferably about 10 to about 20; and x is about 65 to about 98 mole %, more preferably about 75 to about 95 and most preferably about 80 to about 90, and z is about 0.1 to about 3.0 mole %, more preferably about 0.15 to about 2.5, and most preferably about 0.2 to about 2, wherein M is a metal cation selected from the group consisting of Groups IA, IIA, IB and IIB of the Periodic Table of Elements. Typical, but nonlimiting examples of preferred $R_1$ groups are methyl, octadecyl, phenyl and nonylphenyl.

The intrinsic viscosity of the water soluble terpolymers of acrylamide, metal acrylate and alkyl poly(etheroxy)acrylate is about 1 to about 25, more preferably about 2 to about 20, and most preferably about 3 to about 10. The intrinsic viscosity, $[\eta]$, is related to the viscosity average molecular weight, $\overline{M}_\nu$, by the Mark Houwink relationship: $[\eta] = K\overline{M}_\nu$, where K is a constant reflecting the stiffness of the chain and polymer solvent interactions.

It is important that the final aforementioned terpolymer contain the salt form of acrylic acid since the acid form is thermally unstable. It is known that in the presence of acidic groups with pH less than 6 that imide formation can occur, which would reduce the solubility and, hence, viscosification efficiency of the resulting polymer. Furthermore, under acidic or low pH conditions and elevated temperature hydrolysis of acrylamide and alkyl acrylates will occur. When the alkylacrylate, such as an alkyl polyetheroxy acrylate, of the present invention is subjected to acid catalyzed or thermal hydrolysis conditions the alkyl or hydrophobic group will be lost, resulting in a loss of viscosity benefit due to this monomer. Thus, neutralized acrylic acid or salts of acrylic acid are required for the compositions of this invention.

Suitable alkyl poly(etheroxy)acrylate monomers useful in the preparation of the water soluble copolymers of the instant invention are methyl, dodecyl, octadecyl, phenyl, octylphenyl, and nonylphenyl.

Suitable free radical initiators for the instant free radical copolymerization process include potassium persulfate, 2,2'-azobisisobutyronitrile (AIBN), $H_2O_2$, and ethanolamine/sodium sulfite. The concentration of the free radical initiator is about 0.01 to about 1.0 grams per 100 grams of the acrylamide monomer, metal acrylate monomer and alkyl poly(etheroxy)acrylate monomer.

The concentration of the acrylamide monomer, metal acrylate monomer and alkyl poly(etheroxy) monomers in the aqueous polymerization solution is about 1 to about 20 grams of acrylamide monomer, metal acrylate monomer and alkyl poly(etheroxy) monomer per 100 grams of water, more preferably about 3 to about 15, and most preferably about 3 to about 10. Copolymerization of the acrylamide monomer, metal acrylate monomer and alkyl poly(etheroxy) acrylate monomer is effected at a temperature of about 5° to about 80° C., more preferably about 20 to about 60, and most preferably about 40 to about 60 for a period of time of about 0.5 to about 48 hours, more preferably about 2 to about 30, and most preferably about 4 to about 24.

The instant invention advantageously uses no surfactant (emulsifier) in its preparation or final product. The presence of surfactant (emulsifier) is detrimental to both process and product for a number of reasons. For example, it is well known that the presence of additives in acrylamide polymerization tends to lower the molecular weight of acrylamide polymers. Also, the presence of emulsifiers often leads to foaming and handling difficulties. Naturally, the addition of emulsifiers raises the cost of the process and necessitates removal of the emulsifier after the process is complete. The removal of surfactants ks known to be difficult because they are high boiling materials, which are not easily separable by solvent-non-solvent methods.

More seriously, the presence of surfactant (emulsifier) is undesirable in the final product. For example, the presence of surfactants tends to reduce the viscosity of solutions of the instant polymers. Moreover, high concentrations of surfactants can precipitate in the presence of moderate concentrations of divalent metals (e.g., $Ca^{+4}$, $M_9^{++}d$). Such a precipitation can also cause coprecipitation of the polymer. Additionally, some surfactants (e.g., sulfates) are known to be unstable to high temperatures.

Terpolymers of acrylamide, metal acrylate and alkyl poly(etheroxy) acrylate are recovered from the polymerization solution by precipitation with a nonsolvent (e.g., methanol, isopropanol, or acetone), followed by vacuum drying. An alternative recovery technique involves dialysis followed by freeze drying. Alternatively, dialysis can be used. The water soluble copolymers can be either dried by vacuum or by freeze drying means.

DESCRIPTION OF THE PEFERRED EMBODIMENTS

The following examples illustrate the present invention without, however, limiting the same hereto.

EXAMPLE 1

Terpolymer of Acrylamide, Na Acrylate and Nonylphenoxypoly (Ethyleneoxy)$_{10}$ Ethyl Acrylate Acrylamide was recrystallized from acetone and acrylic acid was distilled from hydroquinone monomethyl ether.

To a 2000 ml resin flask fitted with a condenser, thermometer, an electric stirrer, $N_2$ inlet and outlet, was charged 470 g distilled water. The water was purged with $N_2$ for 1 hour. Next 24.24 g acrylamide, 2.8 g of Na acrylate, and 2.76 g of nonylphenoxypoly (ethylene)$_{10}$ ethyl acrylate were charged to the flask. This corresponds to a feed ratio of acrylamide/sodium acrylate/nonylphenoxypoly(ethyleneoxy)$_{10}$ ethyl acrylate of 89/10/1. The monomer mixture was heated to 55° C. under $N_2$ and a 0.015 g quantity of $K_2S_2O_8$ initiator was added. This corresponds to a [M]/[I] of 75. The batch was stirred until it began to climb the stirring shaft. The stirring was terminated; however, the heating continued a total of 4 hours at 55° C. Thereafter, the batch was transferred to a 4 liter beaker and diluted with a solution of (5.06 g $Na_2CO_3$ in 3500 ml $H_2O$) to 0.75% and precipitated in 12 l. of acetone, washed with acetone and vacuum dried at room temperature for three days. A 24.6 g quantity of polymer was collected. This polymer was analyzed by titration and UV spectroscopy to have a molar composition of acrylamide/Na acrylate/nonylphenoxypoly(ethyleneoxy)$_{10}$ ethyl acrylate 82.99/16.78/0.23. The intrinsic viscosity, [n], of this polymer in 2% NaCl was 7.76.

EXAMPLES 2–5

Other co- and Terpolymers of Acrylamide, Na Acrylate and Nonylphenoxypoly (Ethyleneoxy)$_{10}$ Ethyl Acrylate Other Co- and terpolymers at 1% nonylphenoxy poly(ethyleneoxy)$_{10}$ ethyl acrylate charge were prepared similarly and are described and compared with the polymer of Example 1 in Table I. Notice that all terpolymers (Examples 1, 4 and 5) enhanced viscosities at 2,000 and 3,000 ppm in NaCl compared with the copolymer (Example 2). In addition, the terpolymers show superior solution clarity over the copolymer, the latter being near theta condition, with the relatively high hydrophobic (nonylphenoxy poly(ethyleneoxy)$_{10}$ ethyl acrylate) level. The data in this table show an unexpected maximum in viscosity at a Na Acrylate feed of 10%. Thus, this data set also shows the superiority of the instant terpolymers for controlling solution viscosity.

EXAMPLES 6–10

Other co- and Terpolymers of Acrylamide, NaAcrylate and Nonylphenoxypoly (Ethyleneoxy)$_{10}$ Ethyl Acrylate Other Co- and terpolymers at 1.5% nonylphenoxypoly (ethyleneoxy)$_{10}$ ethyl acrylate were prepared similarly to the method of Example 1 and are shown in Table II. Again, all of the terpolymers (Examples 7–10) show enhanced viscosities, solubilities and solvent quality over the copolymer base case (Example 1). There is also a surprising maximum in viscosity at a 10% Na acrylate feed composition. Thus, this data set also shows the improved brine viscosification of the terpolymers of the instant invention compared with the copolymers.

TABLE I

| | | CO- AND TERPOLYMERS OF ACRYLAMIDE, Na ACRYLATE AND NONYLPHENOXYPOLY(ETHYLENEOXY)$_{10}$ ETHYL ACRYLATE[1] | | | | |
|---|---|---|---|---|---|---|
| Example No. | Sample No. | Feed AM/NaA/surf. monomer[2] | Incorporation Am/NaA/surf. monomer[2] | $[\eta]$ 2% NaCl dl/g | $\eta$ at 3,000 ppm in 2% NaCl in cps | $\eta$ at 2,000 ppm in 2% NaCl in cps |
| 2 | 11044-35 | 99/0/1 | 99.68/0/.32 | 3.25 | 27.6 | 4.87 |
| 3 | 11044-30 | 94/5/1 | 90.79/8.9/.31 | 4.8 | 33.18 | 5.45 |
| 1 | 11044-24 | 89/10/1 | 82.99/16.78/.23 | 7.76 | 246.67 | 21.57 |
| 4 | 11044-25 | 84/15/1 | 72.82/26.89/.29 | 3.5 | 117.23 | 8.10 |
| 5 | 11044-26 | 79/20/1 | 67.85/31.82/.33 | 2.6 | 195.87 | 17.37 |

[1] $\sqrt{[M]/[I]} = 75$.
[2] Surf. monomer = nonylphenoxypoly(ethyleneoxy)$_{10}$ ethyl acrylate.

TABLE II

| | | CO- AND TERPOLYMERS OF ACRYLAMIDE, Na ACRYLATE AND NONYLPHENOXYPOLY(ETHYLENEOXY)$_{10}$ ETHYL ACRYLATE[1] | | | | |
|---|---|---|---|---|---|---|
| Example No. | Sample No. | Feed AM/NaA/surf. monomer[2] | Incorporation Am/NaA/surf. monomer[2] | $[\eta]$ 2% NaCl dl/g | $\eta$ at 3,000 ppm in 2% NaCl in cps | $\eta$ at 2,000 ppm in 2% NaCl in cps |
| 6 | 11044-36 | 98.5/0/1.5 | 99.48/0/.52 | 2.5 | 48.77 | 3.86 |
| 7 | 11044-31 | 93.5/5/1.5 | 89.4/10.18/0.42 | 4.1 | 195.38 | 14.83 |
| 8 | 11044-29 | 88.5/10/1.5 | 76.75/23.04/0.21 | 8.3 | 837.71 | 61.05 |
| 9 | 11044-28 | 83.5/15/1.5 | 75.41/24.19/.40 | 6.96 | 464.03 | 40.54 |
| 10 | 11044-27 | 78.5/20/1.5 | 60.28/39.25/.47 | 6.23 | 298.45 | 33.15 |

[1] $[M]/\sqrt{[I]} = 75$.
[2] Surf. monomer = nonylphenoxypoly(ethyleneoxy)$_{10}$ ethyl acrylate.

What is claimed:

1. A water soluble terpolymer having the formula:

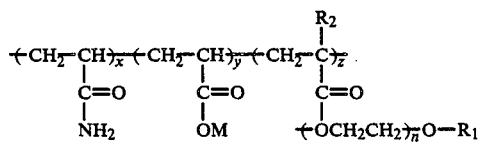

wherein $R_1$ is selected from the group consisting of $C_1$ to $C_{20}$ alkyl groups, $C_6$ to $C_{20}$ aryl groups and $C_6$ to $C_{30}$ alkylaryl groups; $R_2$ is hydrogen or methyl group, n is about 1 to 60; y is about 2.0 to about 35.0 mole %, and x is about 65.00 to about 98.00 mole %, z is about 0.1 to about 3.0 mole % and n is about 1 to about 60 and M is a metal cation selected from the group consisting of Groups IA, IIA, IB and IIB of the Periodic Table of Elements, wherein said terpolymer has an intrinsic viscosity of about 1 to about 25.

2. A terpolymer according to claim 1 wherein $R_1$ is an alkylaryl group having about 1 to about 20 carbon atoms.

3. A terpolymer according to claim 1 wherein $R_1$ is an aryl group having about 6 to 20 carbon atoms.

4. A terpolymer according to claim 1 wherein said terpolymer is free of surfactant or emulsifier.

5. A terpolymer of the structure consisting of:

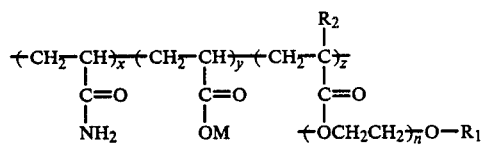

wherein $R_1$ is selected from the group consisting of $C_1$ to $C_{20}$ alkyl groups, $C_6$ to $C_{20}$ aryl groups and $C_6$ to $C_{30}$ alkylaryl groups; $R_2$ is hydrogen or methyl group, n is about 1 to 60; y is about 2.0 to about 35.0 mole %, and x is about 65.00 to about 98.00 mole %, z is about 0.1 to about 3.0 mole % and n is about 1 to about 60 and M is a metal cation selected from the group consisting of Groups IA, IIA, IB and IIB of the Periodic Table of Elements, wherein said terpolymer has an intrinsic viscosity of about 1 to about 25.

6. A terpolymer according to claim 5 wherein $R_1$ is an alkylaryl group having about 1 to about 20 carbon atoms.

7. A terpolymer according to claim 5 wherein $R_1$ is an aryl group having about 6 to 20 carbon atoms.

8. A water soluble terpolymer having the formula:

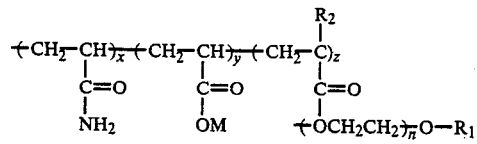

wherein $R_1$ is selected from the group consisting of $C_1$ to $C_{20}$ alkyl groups, $C_6$ to $C_{20}$ aryl groups and $C_6$ to $C_{20}$ alkylaryl groups; $R_2$ is hydrogen or methyl group, n is about 1 to 60; y is about 2.0 to about 35.0 mole %, and x is abut 65.00 to about 98.00 mole %, z is about 0.1 to about 3.0 mole % and n is about 1 to about 60 and M is a metal cation selected from the group consisting of Groups IA, IIA, IB and IIB of the Periodic Table of Elements, wherein said terpolymer has an intrinsic viscosity of about 1 to about 25, wherein said terpolymer is formed by a free radical solution polymerization in the absence of a surfactant or emulsifier and comprises the polymerization of an acrylamide monomer, a metal acrylate monomer and an alkyl poly(etheroxy) acrylate monomer in the presence of a free radical initiation at a temperature of at least 5° C. for at least 0.5 hours.

9. A terpolymer according to claim 8 wherein $R_1$ is an alkylaryl group having about 1 to about 20 carbon atoms.

10. A terpolymer according to claim 8 wherein $R_1$ is an aryl group having about 6 to 20 carbon atoms.

* * * * *